United States Patent [19]

Kurahashi et al.

[11] Patent Number: 5,687,332
[45] Date of Patent: Nov. 11, 1997

[54] IMAGE EDIT PROCESSING SYSTEM

[75] Inventors: Masayuki Kurahashi; Masahiro Maeda; Noriaki Seki; Toshiyuki Tsuzuki; Toru Yamasaki, all of Kanagawa, Japan

[73] Assignee: Fuji Xerox Co., Ltd., Tokyo, Japan

[21] Appl. No.: 584,719

[22] Filed: Jan. 11, 1996

Related U.S. Application Data

[63] Continuation of Ser. No. 91,680, Jul. 15, 1993, abandoned.

[30] Foreign Application Priority Data

Jul. 16, 1992 [JP] Japan .................................. 4-210675

[51] Int. Cl.$^6$ ........................................................ G06F 3/14
[52] U.S. Cl. ............................ 395/335; 395/326; 395/333
[58] Field of Search .................................. 395/155, 156, 395/157, 158, 159, 160, 161, 133, 135, 139, 600, 326, 329, 330, 331, 332, 333, 334, 335, 336, 339, 200.03, 200.18, 610

[56] References Cited

U.S. PATENT DOCUMENTS

| | | | |
|---|---|---|---|
| 4,907,274 | 3/1990 | Nomura et al. | 380/30 |
| 4,998,132 | 3/1991 | Kurogane et al. | 355/40 |
| 5,222,157 | 6/1993 | Yoneda et al. | 382/41 |
| 5,357,601 | 10/1994 | Kagawa | 395/135 |
| 5,383,027 | 1/1995 | Harvey et al. | 358/296 |

OTHER PUBLICATIONS

Jürgen Schönhut et al., "Constructive Page Description," IEEE Computer Graphics & Applications, pp. 71–78, Mar. 1991.

Primary Examiner—Thomas G. Black
Assistant Examiner—Ruay Lian Ho
Attorney, Agent, or Firm—Finnegan, Henderson, Farabow, Garrett & Dunner, L.L.P.

[57] ABSTRACT

In an image edit processing system, a first image edit processing apparatus analyzes information for editing an image by means of a first information analyzer, and has a first image-editing-information generator for generating information to edit the image in accordance with the analyzed information. An image storing/editing apparatus includes an image memory for storing the image, analyzes information for editing the image by a second information analyzer, and includes a second image-editing-information generator for generating information to edit the image in accordance with the analyzed information. The apparatuses are connected together via an information transmitting path. Memory may be provided for storing for a fixed period of time the image edited by the first image edit processing apparatus.

7 Claims, 13 Drawing Sheets

IMAGE EDIT PROCESSING SYSTEM

This application is a continuation of application Ser. No. 08/091,680, filed Jul. 15, 1993, now abandoned.

BACKGROUND OF THE INVENTION

1. Field of the Invention

The present invention relates to an image edit processing system and an editing system for an image edit processing apparatus and an image editing/storing apparatus connected together through a network.

2. Description of Related Art

FIG. 15 is a block diagram for illustrating a conventional image edit processing apparatus which processes and/or edits an image.

In FIG. 15, an image server 152, workstations 153, 154, an a print server 155, for instance, are connected to a network 151. The image server 152 has an image storage device 156 in which results of processing and/or editing of images are stored. In addition, the workstation 153 has an image scanner 157 for fetching an image, as necessary.

In the workstation 153, when an image is processed and/or edited, the following processing is conventionally performed by making use of the image server 152 connected to the network 151.

For example, at the time of editing an input image received from the image scanner 157, the workstation 153 sends the input image to the image server 152 through the network 151 to effect edit processing there. In addition, after edit processing is carried out for that image, the image subsequent to editing is sent to the print server 155 so as to be printed, or image data is transferred to the workstation 153 through the network 151.

In this system, when the results of editing of the image are corrected, it is necessary to send the image again through the network 151. For this reason, the load on the network 151 has been very large partly due to the fact that the capacity of an image file is large.

In addition, since the capacity of the image file is large, much time has been involved in processing in the image server 152.

Furthermore, the image server 152 provides images without taking into account the characteristics of the image processing/editing apparatus in the workstation 153. For example, despite the fact that the workstation 153 may be an apparatus capable of only monochromatic processing, the image server 152 may send color image data to the workstation 153. As another example, the image server 152 may send to a workstation display unit data of a high resolution while ignoring a lower resolution of the display unit.

The image server 152 in the above-described conventional technique provides images without taking into account the characteristics of the image processing/editing apparatus in the workstation, i.e., a destination to which the images are sent. For this reason, data which is not required by the workstation is sent to the network, so that an unnecessarily large load is applied to the network.

In addition, the image processing/editing apparatus on the workstation side is required to convert image data of, for instance, a high resolution which is sent thereto via the network into a resolution suitable for processing by that image processing/editing apparatus. Thus, a load for this purpose is imposed on that image processing/editing apparatus.

Furthermore, since high loads are imposed upon the network owing to the transfer of image data, the processing capabilities of other information processing apparatuses connected to the network decline. Additionally, as for the image data transferred via the network, there has been a problem in that it takes time in transferring the image data from the image server to a client.

SUMMARY OF THE INVENTION

The present invention has been made to overcome the above-described problems, and its object is to provide an image edit processing system and an image edit processing apparatus in which an image server is gapable of sending an image corresponding to an image processing/editing apparatus at a destination to which the image is to be provided.

Another object of the present invention is to provide an image edit processing system and an image edit processing apparatus which reduce the amount of transfer of data flowing in a network, and alleviate a processing load on an image processing/editing apparatus by allowing a portion of processing by the image processing/editing apparatus of a workstation to be undertaken by a server, thereby attaining high-speed image processing through the decentralization of processing.

Still another object of the present invention is to provide an image edit processing system and an image edit processing apparatus for improving the processing capability of the overall network by reducing the amount of transfer of data flowing in the network.

An image edit processing system according to a first aspect of the invention comprises a first image edit processing apparatus including first information-transmitting-path connecting means for allowing information for editing an image to flow through an information transmitting path or for acquiring information from the information transmitting path, first information analyzing means for analyzing information for editing the image obtained from the information transmitting path, and image-editing-information generating means for editing the image in accordance with an instruction from the first information analyzing means and for generating information for editing the image, and an image storing/editing apparatus including image storing means for storing the image, second information analyzing means for analyzing information for editing the image, second image-editing-information generating means for editing the image in accordance with an instruction from the second information analyzing means, and second information-transmitting-path connecting means for allowing the image edited by the first image edit processing apparatus to flow through the information transmitting path or for acquiring information from the information transmitting path, in which the first image edit processing apparatus and the image storing/editing apparatus are connected together through the information transmitting path.

A first image edit processing apparatus according to a second aspect of the invention comprises: first image storing means for storing for a fixed period of time the image edited by the image storing/editing apparatus, and first image-diverting means for using the image stored in the first image storing means as an edited image if the image stored in the first image storing means and the image generated by the information for editing the image generated by the first image-editing-information generating means are identical.

A second image edit processing apparatus according to a third aspect of the present invention comprises: second image storing means for storing for a fixed period of time the image edited by the image storing/editing apparatus; information analyzing means for analyzing information for editing the image; third information-transmitting-path connecting means for acquiring from the information transmitting path the image edited by the first image editing/processing apparatus and/or the image storing/editing apparatus; second image-diverting means for using the image stored in the second image storing means as an edited image if the image stored in the second image storing means and the image generated by the information for editing the image generated by the image-editing-information generating means are identical; and image outputting means for outputting the image generated by the second image-diverting means.

The image edit processing system according to a fourth aspect of the invention is arranged such that the image storing/editing apparatus, and the image storing/editing apparatus, and the second image edit processing apparatus are connected together via the information transmitting path.

The image edit processing apparatus according to a fifth aspect of the invention is characterized in that the information for editing the image is formed in a tree structure.

The image edit processing apparatus according to a sixth aspect of the invention is characterized in that the image structured at each stage of the tree structure is stored in the first and second image storing means for storing the image for the fixed period of time in the image storing means.

According to the first aspect of the invention, the first information-transmitting-path connecting means in the first image edit processing apparatus connects the first image edit processing apparatus to an information transmitting path, e.g. a network, for allowing information necessary for editing an image to flow or for acquiring the information. Then, upon requesting an image in the image storing/editing apparatus, the first image edit processing apparatus analyzes data sent from the image storing/editing apparatus by means of the first information analyzing means. The image-editing-information generating means edits the image in accordance with an instruction from the first information analyzing means and generates information for editing the image.

The second information-transmitting-path connecting means in the image storing/editing apparatus connects the image storing/editing apparatus to the information transmitting path, e.g. the network for allowing information necessary for editing the image to flow or for acquiring the information. In addition, the image storing/editing apparatus is provided with the image storing means for storing the image, and provides the image stored in the image storing means upon request from the first image edit processing apparatus. Then, the image storing/editing apparatus analyzes the data based on the request of an image from the first image edit processing apparatus by means of the second information analyzing means. The second image-editing-information generating means edits the image in accordance with an instruction from the second information analyzing means, and generates information for editing the image.

As described above, since the image edit processing system in accordance with the present invention is capable of editing an image either by the first image edit processing apparatus or the image storing/editing apparatus, the load imposed on the image storing/editing apparatus and the information transmitting path is alleviated.

In addition, since the image edit processing system in this invention is provided with the first information analyzing means and the second information analyzing means, it is possible to transfer from the image storing/editing apparatus via the information transmitting path an image by taking into account the characteristics of the first image edit processing apparatus, i.e., the resolution of the image. For this reason, a large load is not applied to the information transmitting path.

According to the second aspect of the invention, in the first image edit processing apparatus, the first image storing means stores for a fixed period of time the image which has been edited by the image storing/editing apparatus and is used relatively frequently. The first image-diverting means examines whether the image stored in the first image storing means and the image generated by the information for editing the image generated by the first image-editing-information generating means are identical, and if identical, uses the image stored in the first image storing means as an edited image.

It is unnecessary for the first image edit processing apparatus having the above-described first image storing means to obtain the relatively frequently used image from the image storing/editing apparatus via the information transmitting path. For this reason, the load on the information transmitting path is alleviated by the portion in which that image is transferred, and the time required for transferring the image is reduced.

According to the third aspect of the invention, the second image storing means stores for a fixed period of time the image which has been edited by the image storing/editing apparatus and is used relatively frequently in the second image edit processing apparatus, e.g., a print server. The second image-diverting means examines whether the image stored in the second image storing means and the image generated by the information for editing the image generated by the image-editing-information generating means are identical, and if identical, uses the image stored in the second image storing means as an edited image.

Then, the second image edit processing apparatus outputs the image subjected to edit processing by means of the image outputting means, and the image is sent to the first image edit processing apparatus via the information transmitting path.

It is unnecessary for the second image edit processing apparatus having the above-described second image storing means to obtain the relatively frequently used image from the image storing/editing apparatus or the image storing means via the information transmitting path. As a result, the load on the information transmitting path is alleviated by the portion in which that image is transferred, and the time required for transferring the image is reduced.

According to the fourth aspect of the invention, since the image edited by the first image edit processing apparatus and the second image edit processing apparatus can be stored for a fixed period of time, so that a necessary minimum amount of information flows through the information transmitting path to which these image edit processing apparatuses and the image storing/editing apparatus are connected. Accordingly, the load on the information transmitting path is alleviated, and the efficiency of the other information processing apparatuses connected to the information transmitting path can be improved. Then, the image edit processing system can include various combinations selected from the first image edit processing apparatus having the first image storing means for storing the edited image for a fixed period of time, the first image edit processing apparatus not having the first image storing means, the second image edit processing apparatus having the second image storing means, and the second image edit processing apparatus not having the second image storing means.

As a result, it is possible to structure an image edit processing system which excels in efficiency of the information transmitting path and the respective information processing apparatuses.

According to the fifth aspect of the invention, since the information for editing the image is formed in a tree structure, it is possible to obtain a desired image while combining, for instance, the original image in accordance with the editing information.

According to the sixth aspect of the invention, since the information for editing the image is formed in the tree structure, for example, the original image and and intermediate image obtained by combining the original image can be stored in an image storing device. Through the storage of such an image, a desired image can be edited speedily in accordance with the image information.

DETAILED DESCRIPTION OF THE PREFERRED EMBODIMENTS

In the present invention, an image subsequent to processing/editing is developed from image data before editing and processing/editing data corresponding thereto. That is, since the image server retains only the image data prior to editing, in a case where processing/editing data is transferred from a workstation to the image server, the processing/editing of the pre-editing image data is based on the transferred processing/editing data.

Since the data transferred over the network is only processing/editing data, alleviation of the load on the network and decentralization of processing are easily realized.

As an image suitable for such processing, CPD (Constructive Page Description) and the like have already been proposed. (See J. Schonhut et al., "Constructive Page Description" IEEE Computer Graphics and Applications, Mar. 1991.)

Figure 1:
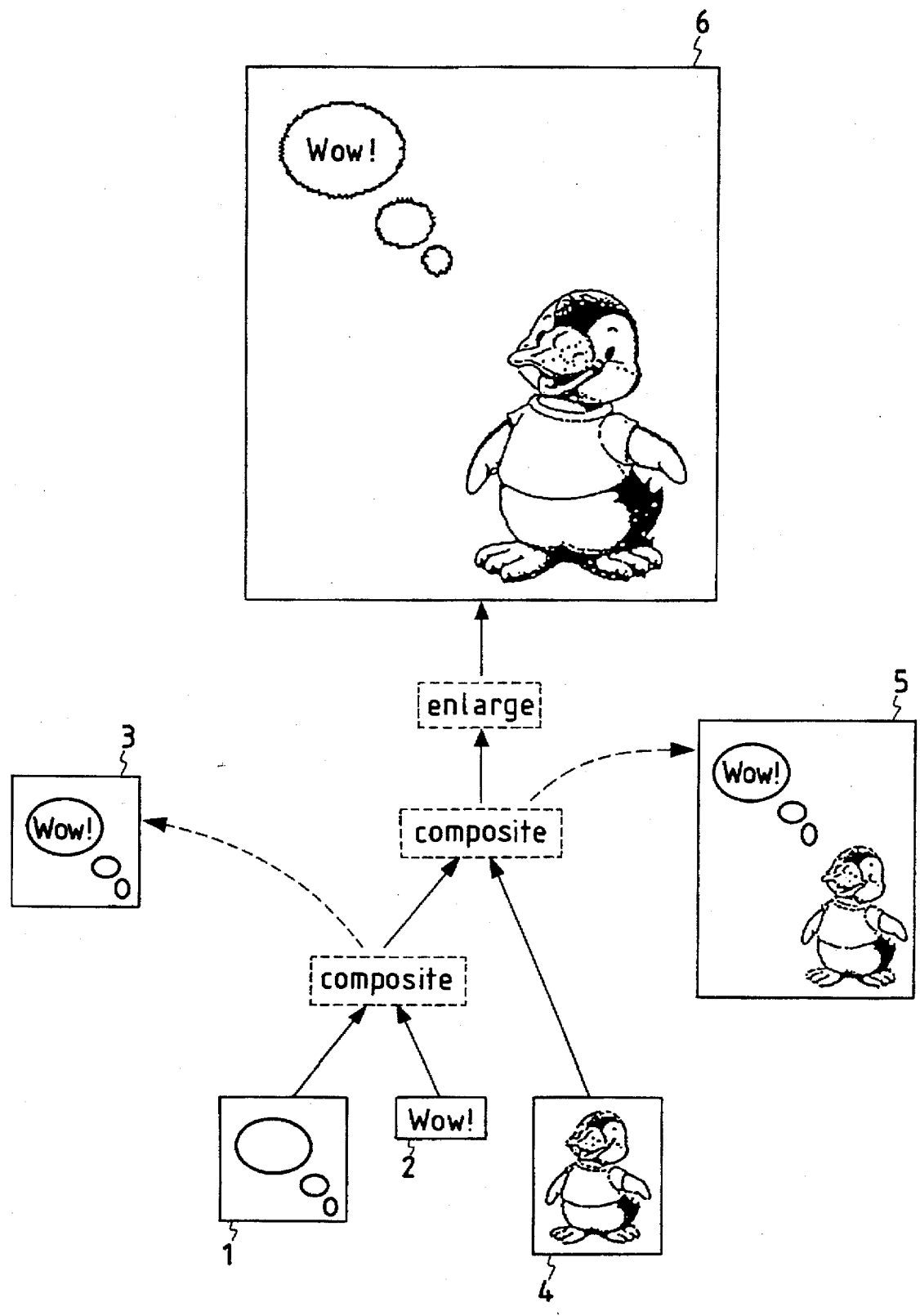
FIG. 1 is a diagram illustrating an example of representing an image by means of an original image and edit data according to the present invention.

FIG. 1 is a diagram illustrating an example of representing an image by means of an original image and edit data in accordance with the preferred embodiment.

In FIG. 1, the image data to be edited is schematically represented by a tree structure. In this tree structure, leaf nodes show original image data prior to editing which serve as bases, respectively. For instance, there are circular figures 1 constituting minimum units of the image, a word "Wow!" 2 to be entered in one of the circular figures, and a "duck" 4. Each intermediate node represents an image processing or an editing procedure using the nodes located therebelow as data. For example, in order to edit an image in which "Wow!" 2 is inserted in the circular FIG. 1, the circular FIG. 1 and "Wow!" 2 are combined to form an image 3.

In addition, in an ensuing intermediate node, the composite image 3 and the original image "duck" 4 are combined to form an image 5.

Then, an image 6 in which the edited image data is enlarged is formed in a final root node.

In this embodiment, the image data at a leaf node is stated as original image data, and processing and editing which are necessary for combining the original data are stated as editing data.

Figure 2:
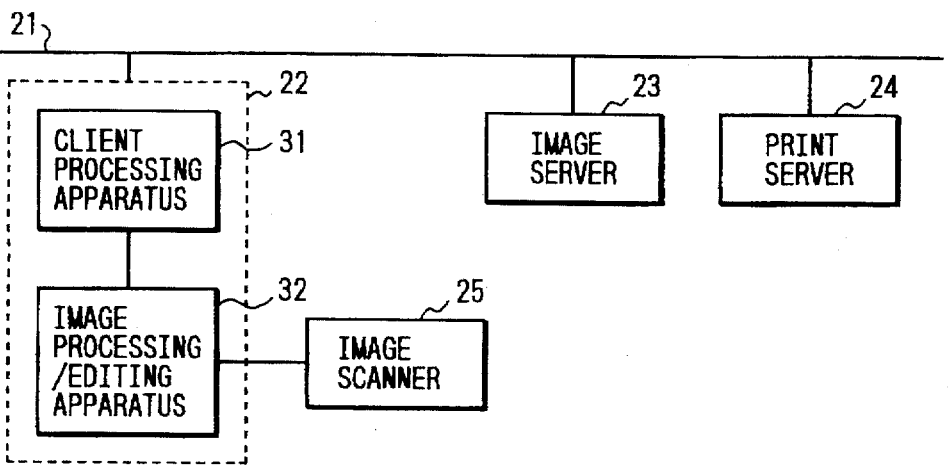
FIG. 2 is a diagram illustrating an overall schematic configuration according to the present invention.

FIG. 2 is a diagram illustrating an overall schematic configuration of the embodiment in accordance with the present invention.

In FIG. 2, a client 22, an image serve 23, and a print server 24 are connected to a network 21. The client 22 is comprised of a client processing apparatus 31 and a conventionally existing image processing/editing apparatus 22, and is capable of requesting an edited image from the image server 23 connected to the network 21. In addition, the image processing/editing apparatus 32 is capable of being equipped with an image scanner 25, as required.

Figure 3:
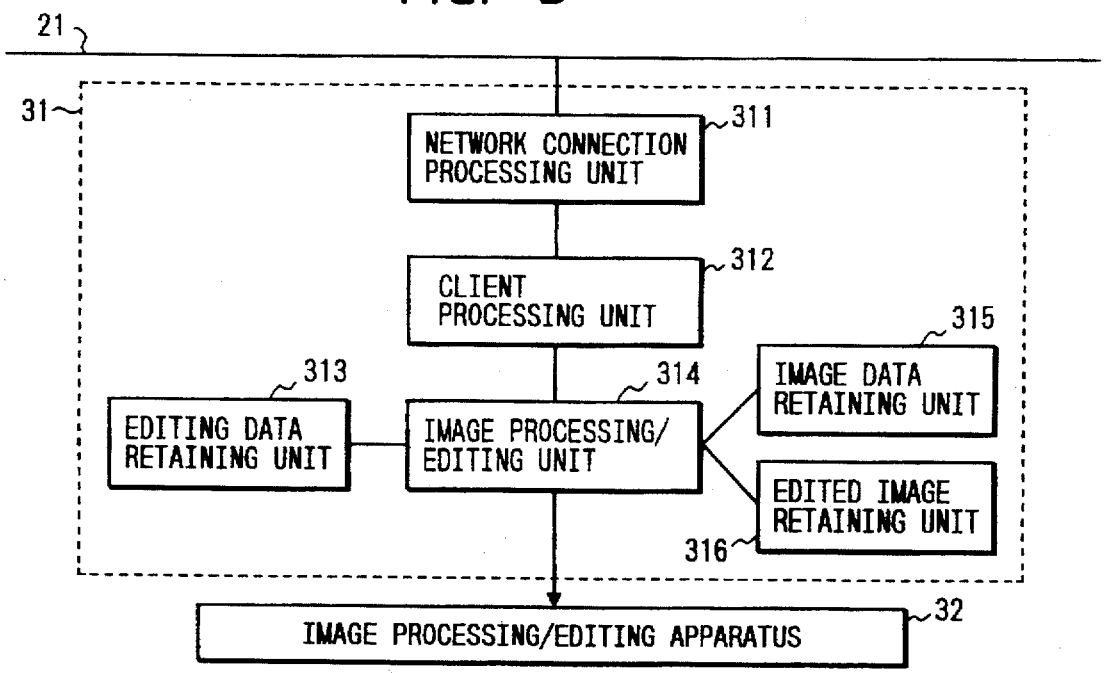
FIG. 3 is a diagram of a configuration for explaining a client according to the present invention.

FIG. 3 is a diagram of a configuration of the embodiment for explaining the client 22 in the present invention.

In FIG. 3, the client processing apparatus 31 in the client 22 is comprised of the following: a network connection processing unit 311 for connecting the client 22 to the network 21; a client processing unit 312 for performing processing, such as obtaining image data suitable for processing by the client 22 or allowing the image server 23 to perform part of the processing, by conducting analysis of editing data, by effecting a changeover as to whether the image is to be processed by the client 22 or by the image server 23, or by sending operations of processing/editing to the image server 23 as the editing data; an image processing/editing unit 314 for processing and editing the image sent thereto from the image server 23; an editing data retaining unit 313 for retaining the editing data for editing the image; an image data retaining unit 315 for retaining only the image data; an edited image retaining unit 316 for retaining the edited image processed and edited by the image processing/editing unit 314.

Figure 4:
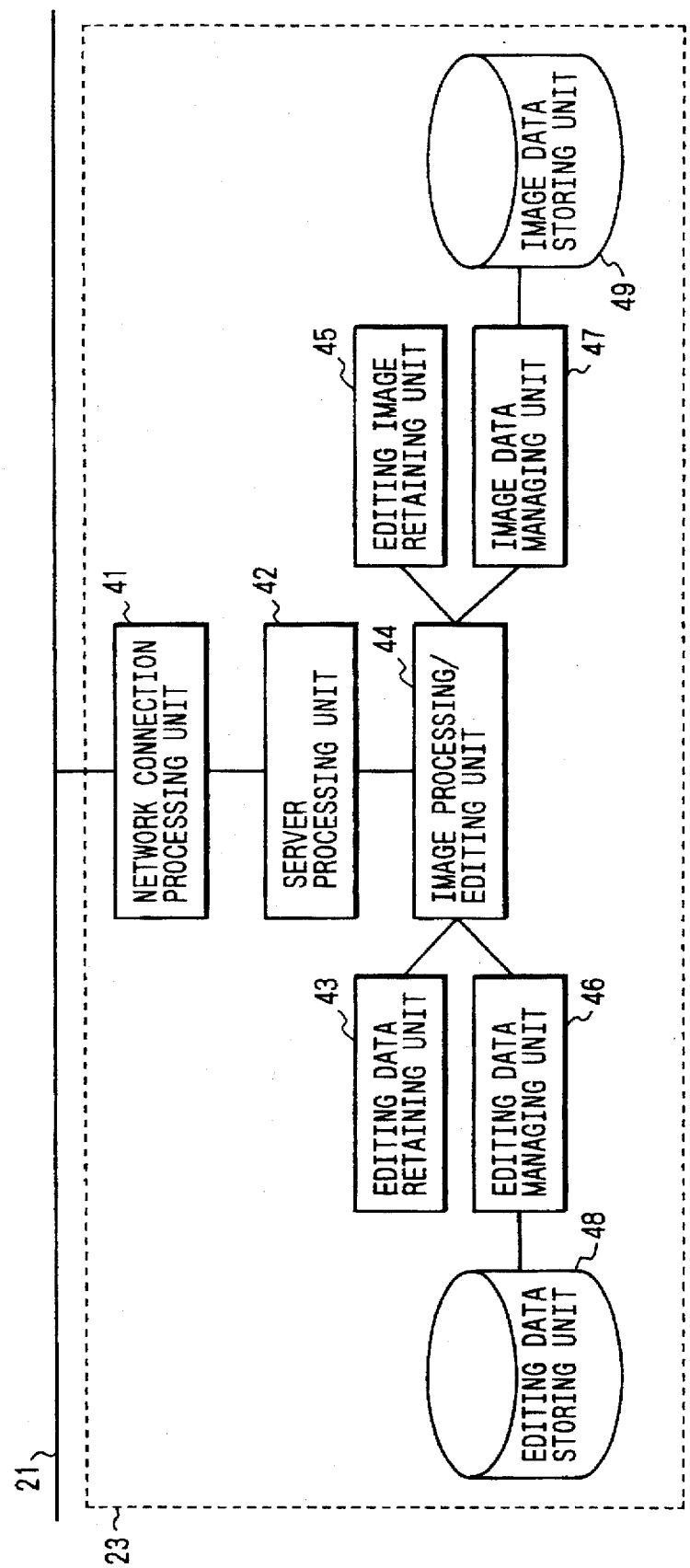
FIG. 4 is a diagram of a configuration illustrating an image server according to the present invention.

FIG. 4 is a diagram of a configuration of the embodiment illustrating the image server in the present invention.

In FIG. 4, the image server 23 is comprised of the following: a network connection processing unit 41 for connecting the image server 23 to the network 21; a server processing unit 42 for performing processing, such as conducting analysis of editing data, effecting a changeover as to whether the image is to be processed by the image server 23 or by the client 22, or sending image data suitable for processing by the client 22 by using operations of processing/editing to the image server 23 as the editing data; an image processing/editing unit 44 for processing and editing the image sent thereto from the client 22 or the image data retained in the image data retaining unit 315, which will be described later, on the basis of the editing data; an editing data retaining unit 43 for temporarily retaining the editing data for editing an image; an editing image retaining unit 45 for retaining only the image data for editing; an editing data storing unit 48 for storing the editing data; an editing data managing unit 46 for managing the editing data stored in the editing data storing unit 48; an image data storing unit 49 for storing the image data; and an image data managing unit 47 for managing the image data in the image data storing unit 49.

The image server 23 retains all the original images which are processed/edited by the client 22. Accordingly, the editing data is sent from the client 22, and the image processing/editing unit 44 in the image server 23 generates a desired image on the basis of the editing data.

For instance, the image data requested by the client 22 is sent to the image server 23 through the network 21 in the form of the editing data. Upon storing the editing data in the editing data retaining unit 43, the image processing/editing unit 44 in the image server 23 analyzes the same, and after generating the editing image on the basis of the image data stored in the image data storing unit 49, the image processing/editing unit 44 retains the same in the editing image retaining unit 45. The edit processing of the image in this image processing/editing unit 44 will be described in detail later with reference to a flowchart.

The editing image thus generated is sent to the client 22 through the network connection processing unit 41 and the network 21. In this manner, necessary image data is processed by the image server 23 and is then sent to the client 22.

Accordingly, the amount of the image data flowing through the network is reduced, and the processing and editing of the image are decentralized on the side of the client 22 side and on the side of the image server 23, thereby making it possible to increase the image processing speed.

Figure 5:
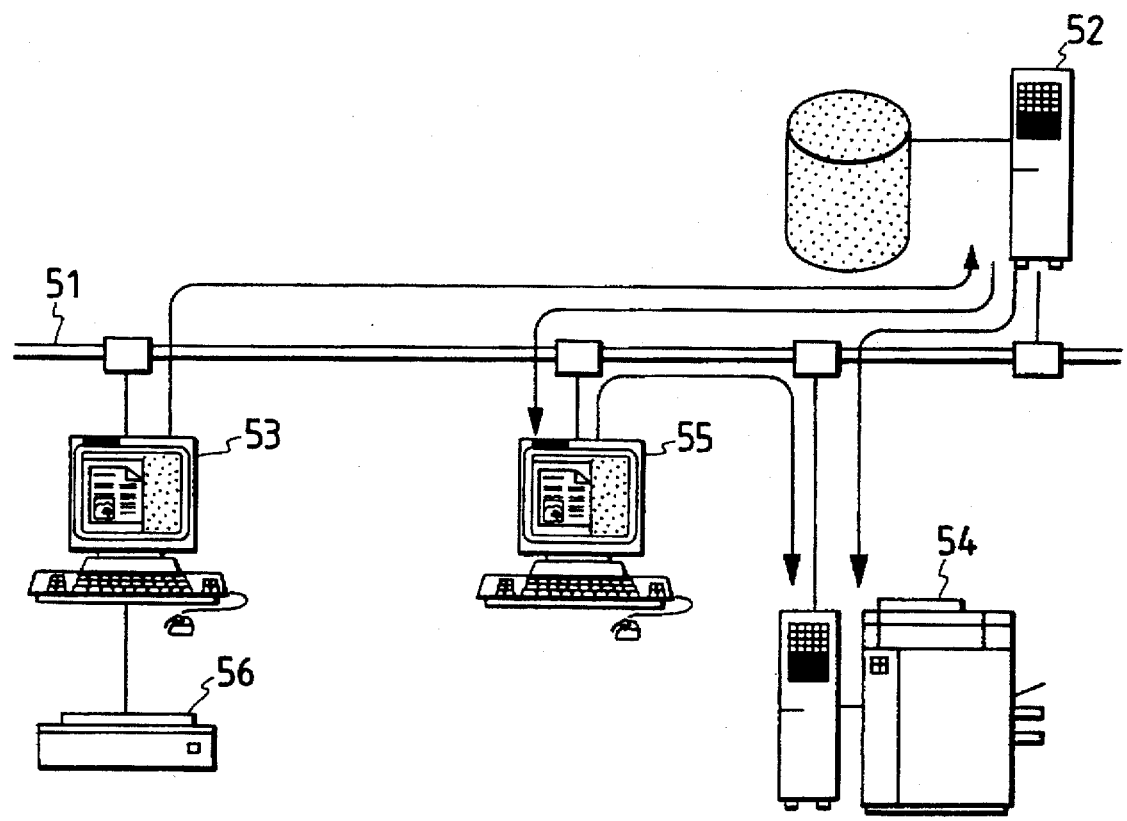
FIG. 5 is a diagram of a schematic configuration in an image edit processing system according to the present invention.

FIG. 5 is a diagram of a schematic configuration in an image edit processing system in accordance with the present invention.

In FIG. 5, the image edit processing system comprises a network 51, an image server 52 connected to the network 51, a workstation 53, and a printer server 54. In addition, other workstations 55 can be connected to the network 51, as required. In the workstation 53, an image can be entered by using an image scanner 56.

For example, the image data entered from the image scanner 56 connected to the workstation 53 is transferred to the image server 52 through the network 51. An ID for facilitating fetching is attached to the image data as well as newly prepared editing data so as to enable management thereof, and these items of data are respectively stored in the editing data storing unit 48 and the image data storing unit 49 which are shown in FIG. 4.

When the aforementioned image is edited by the image editing workstation 55, the image processing/editing unit 314 sends as editing data information on image data suitable for display by a display unit provided in the workstation 55, such as resolution and color information, to the image server 52 through the client processing unit 312. In the image server 52, the image processing/editing unit 44 prepares the requested image data by using the image data in the image data storing unit 49 on the basis of the editing data sent thereto, and sends the image data together with the editing data back to the image editing workstation 55, i.e., the client, through the server processing unit 42.

On the basis of these transferred items of data, in the image editing workstation 55, for instance, editing is carried out, and its contents are stated as editing data. In addition, when the edited results are displayed on a display unit, the image generated by the image processing/editing unit 314 of the image editing workstation 55 is displayed on the basis of the editing data and the original image data.

Figure 6:
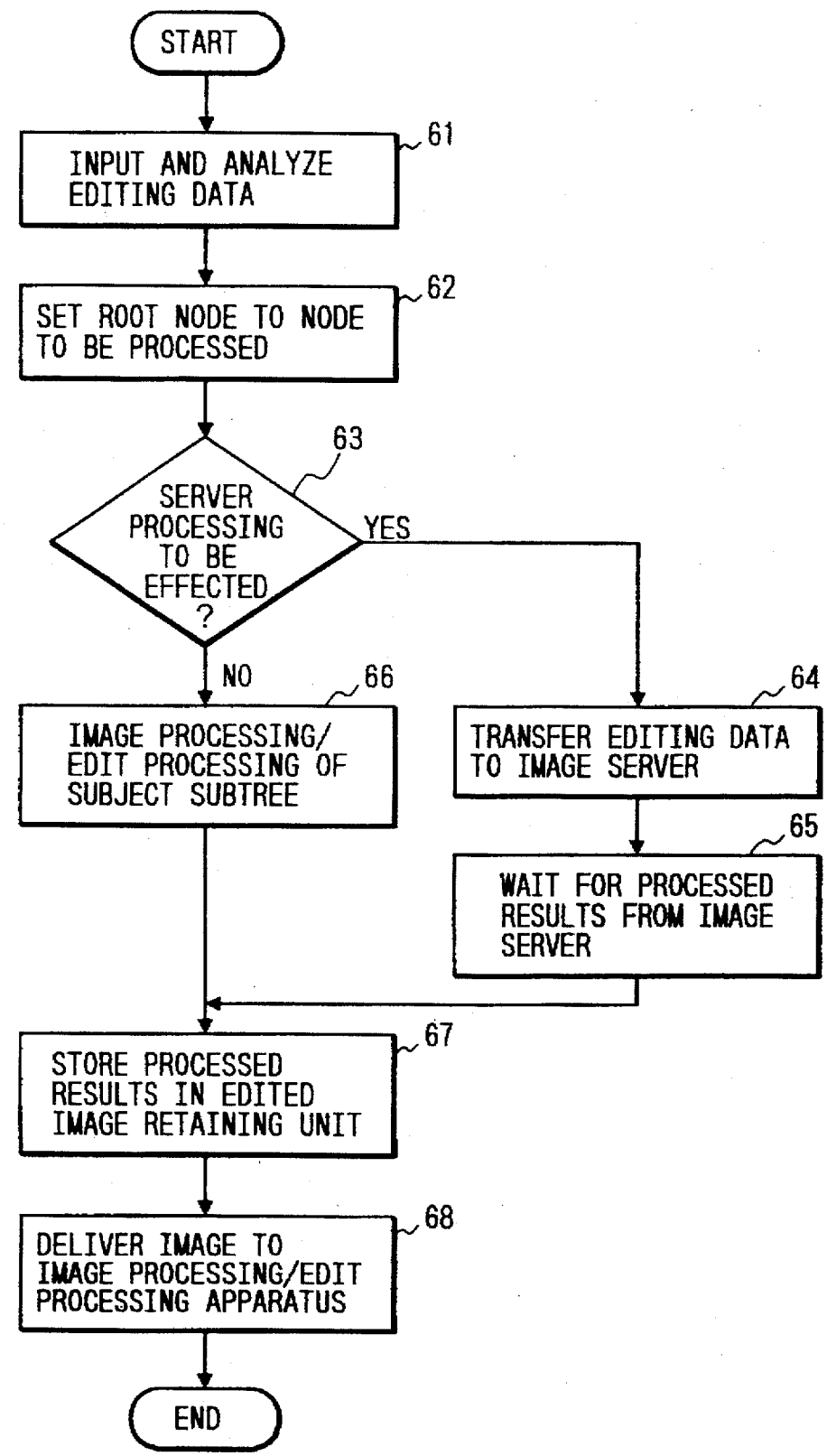
FIG. 6 is a flowchart explaining image processing/edit processing by the client according to the present invention.

FIG. 6 is a flowchart representing image processing/edit processing by the client in accordance with the preferred embodiment of the present invention.

The processing in the flowchart shown in FIG. 6 is executed top-down from the root node shown in FIG. 1. At this time, processing can be decentralized by allowing the image server 23 to perform the processing of subtrees. The determination as to whether the image server 23 is to perform the processing is made by observing the state of the load on the client 22. For instance, the client 22 requests an original image to the image server 23, and analyzes the editing data which is sent thereto from the image server 23 as necessary for combining the original image. The client 22 analyzes the contents of the editing data, e.g., how the tree structure is formed (Step 61).

As for the image 6 to be obtained as a final result shown in FIG. 6, the root node is set to the node subject to processing (Step 62).

The client processing unit 312 in the client 22 examines, for instance, the state of load on the network 21 or the image server 23, and determines whether the editing/processing of the image is to be performed on the image server 23 side (Step 63).

If the load on the image server 23 side is relatively light, a determination is made to process/edit the image on the image server 23 side, and the editing data is transferred to the image server 23 (Step 64).

While the image is being processed/edited by the image server 23, the client 22 waits for its results (Step 65).

If a determination is made in Step 63 that the image is not to be processed/edited on the image server 23 side, the image processing/edit processing of the subject subtree, which will be described later in detail, is performed on the side of the client 22 with reference to the flowchart shown in FIG. 8 (Step 66).

The image for which processing/edit processing has been completed is stored in the edited image retaining unit 316 as the result of processing (step 67).

The image stored in the edited image retaining unit 316 is delivered, as required, to the image processing/editing apparatus 32, and is subjected to processing/editing which is conventionally performed (Step 68).

Figure 7:
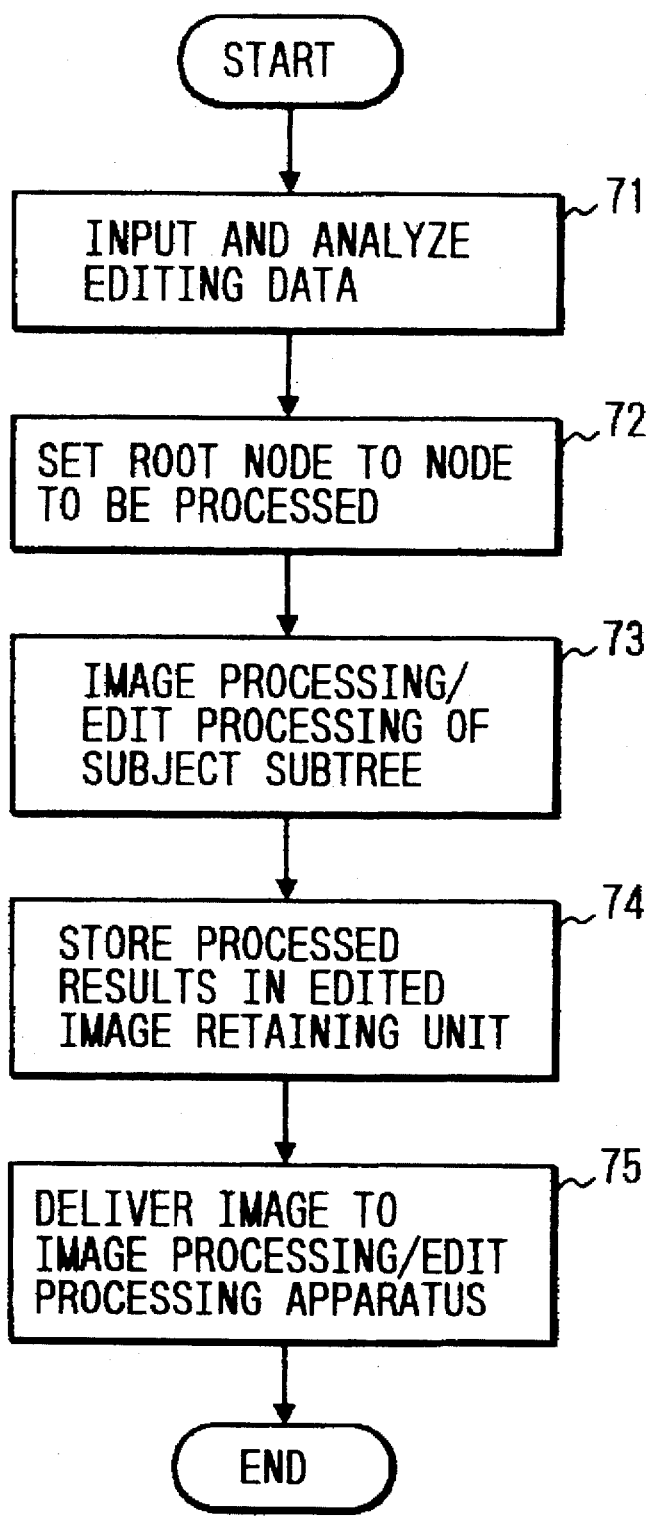
FIG. 7 is a flowchart explaining image processing/edit processing by the image server according to the present invention.

FIG. 7 is a flowchart representing image processing/edit processing by the image server in accordance with the preferred embodiment of the present invention.

The processing in the flowchart shown in FIG. 7 is executed top-down from the root node shown in FIG. 1, in the same way as described for the processing on the side of the client 22. For instance, editing data requested from the client 22 is transmitted to the image server 23, and the image server 23 analyzes its contents (Step 71).

As for the image 6 to be obtained as a final result shown in FIG. 1, the root node is set to the node subject to processing (Step 72).

The image processing/editing unit 44 in the image server 23 performs the image processing/edit processing of the subject subtree, which will be described later in detail, with reference to the flowchart shown in FIG. 9 (Step 73).

The image for which processing/edit processing has been completed is stored in the editing image retaining unit 45 as the result of processing (Step 74).

The image stored in the editing image retaining unit 45 is delivered, as required, to the image processing/editing apparatus 32, and is further subjected to processing/editing (75).

Figure 8:
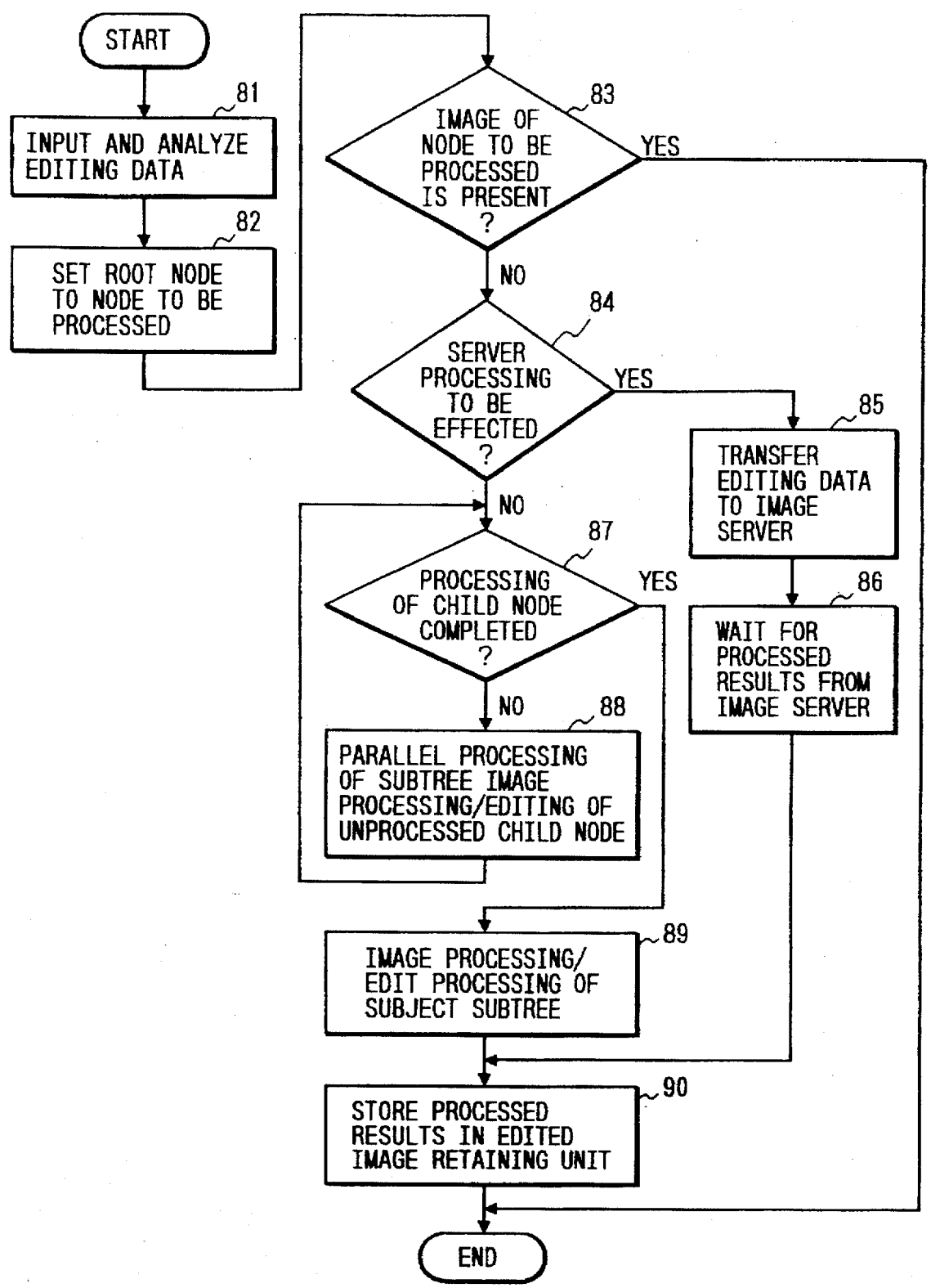
FIG. 8 is a flowchart explaining the image processing/edit processing of a subject subtree by the client.

FIG. 8 is a flowchart representing the image processing/edit processing of a subject subtree by the client.

The editing data transferred from the image server 23 is applied to the client 22, and the client 22 analyzes its contents (Step 81).

As for the image 6 to be obtained as a final result shown in FIG. 1, the root node is set to the node subject to processing (Step 82).

The client processing unit 312 in the client 22 examines whether an image of the node subject to processing is present in, for instance, the edited image retaining unit 316 on the side of the client 22. If the image of the node subject to processing is present, editing/processing ends (Step 83).

Next, the client processing unit 312 in the client 22 examines the state of the load on the network 21 and on the image server 23, and determines whether the editing/processing of the side of the image is to be performed on the image server 23 (Step 84).

If the load on the side of the image server 23 is relatively light, a determination is made to process/edit the image on the side of the image server 23, and the editing data is transferred to the image server 23 (Step 85).

While the image is being processed/edited by the image server 23, the client 22 waits for its results (Step 86). When the image for which processing/editing has been completed is sent thereto from the image server 23, the operation proceeds to Step 90 which will be described later.

If a determination is made in Step 84 that the image is not to be processed/edited on the side of the image server 23, the image processing/edit processing of the subject subtree is performed on the side of the client 22. That is, an examination is made as to whether the node subject to processing is present at a lower position in the tree structure (Step 87).

The image processing/editing unit 44 in the image server 23 performs the image processing/edit processing of the subject subtree at an unprocessed child node. Then, this step is repeated until the processing of the child nodes is completed (Step 88).

When the processing of the child nodes is completed, the image of the subject node is subjected to processing/edit processing. That is, the original image at the node in the lowermost position is combined as an intermediate node in accordance with the tree structure. For instance, the original image and the image at the intermediate node is combined (Step 89).

The image for which processing/edit processing has been completed is stored in the editing image retaining unit 45 as the result of processing (Step 90).

Figure 9:
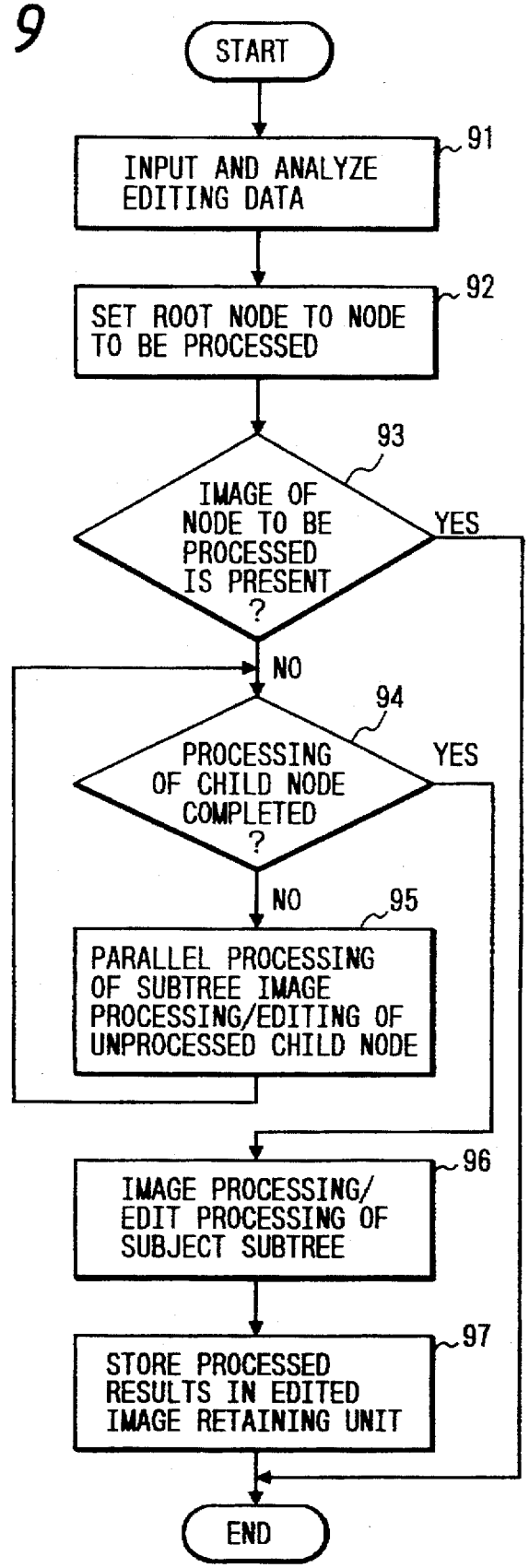
FIG. 9 is a flowchart explaining the image processing/edit processing of the subject subtree by the image server.

FIG. 9 is a flowchart representing the image processing/edit processing of a subject subtree by the image server.

The difference between the image processing/edit processing of a subject subtree by the image server in FIG. 8 and the image server in FIG. 9 lies in the fact that it is unnecessary for the image server to examine whether server processing is to be performed. That is, Step 84 and subsequent Steps 85 and 86 in FIG. 8 are not provided for the image-server side.

Figure 10:
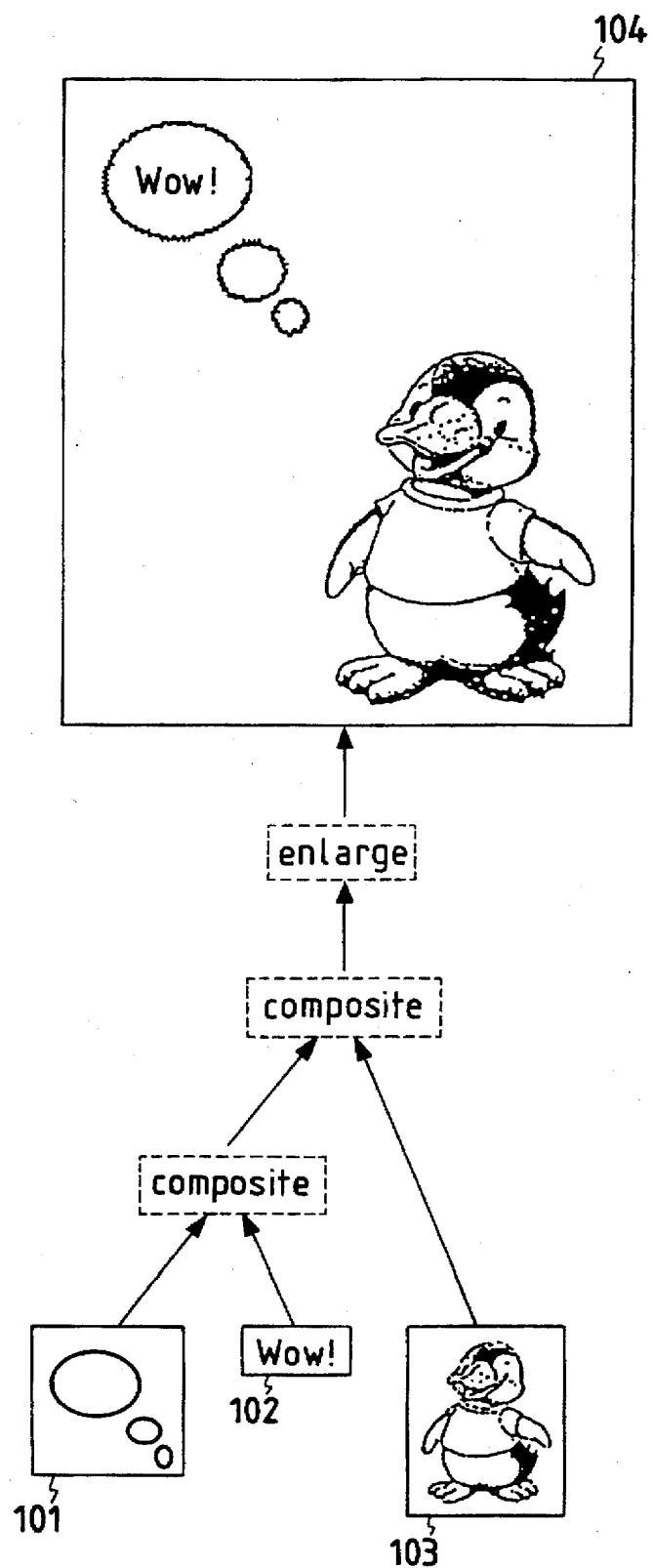
FIG. 10 is a diagram illustrating another example of representation of the image using the original image and the editing data according to the present invention.

FIG. 10 is a diagram illustrating another example of a representation of the image using the original image and the editing data in accordance with the preferred embodiment.

In FIG. 10, the image data to be edited is schematically represented by a tree structure. In this tree structure, leaf nodes show original image data prior to editing which serve as bases, respectively. For instance, there are circular figures 101 constituting minimum units of the image, a word "Wow!" 102 to be entered in one of the circular figures, and a "duck" 103. Each intermediate node represents an image processing or an editing procedure using the nodes located therebelow as data. For example, an image for combining the circular FIGS. 101 and "Wow!" 102 is edited, and this edited image and the "duck" 103 are combined to form an image 104.

Then, the edited image data is finally formed in enlarged form in the root node.

Figure 11:
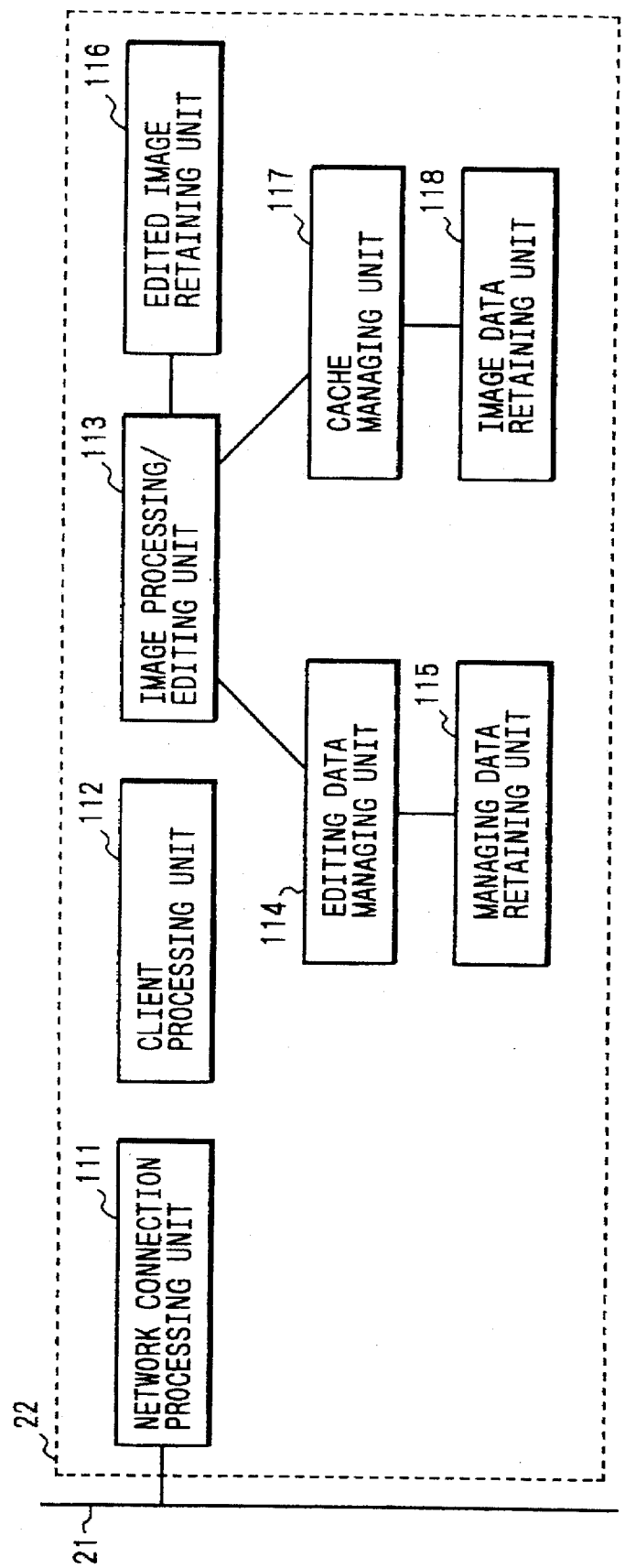
FIG. 11 is a diagram of an schematic configuration explaining the client according to the present invention.

FIG. 11 is a diagram of another schematic configuration of the client in accordance with another embodiment the present invention.

In FIG. 11, the client 22 connected to the network 21 is comprised of the following: a network connection processing unit 111 for connecting the client 22 to the network 21 and performing the transfer of data; a client processing unit 112 for performing processing, such as obtaining image data suitable for processing by the client 22 or allowing the image server 23 to perform part of the processing, by conducting analysis of editing data, by effecting a changeover as to whether the image is to be processed by the client 22 or by the image server 23, or by sending operations of processing/editing to the image server 23 as the editing data; an image processing/editing unit 113 for generating the image of the edited result on the basis of the original image and editing data sent thereto from the image server 23; an editing data retaining unit 115 for retaining the editing data for editing the image; an editing data managing unit 114 for managing the editing data of the editing data retaining unit 115; an edited image retaining unit 116 for retaining the edited image processed and edited by the image processing/editing unit 314; an image data retaining unit 118 for retaining the edited image data for a fixed period of time; and a cache managing unit 117 for managing the image data being retained in the image data retaining unit 118.

It should be noted that the aforementioned image data retaining unit 118 is a storage device which is generally called cache and stores data for a fixed period of time, and the data which is not used for a long period of time is deleted consecutively.

When a request for an original image is made from the client 22, that image is sent from the image server 23 to the client 22 through the network 21. The editing data for the image is retained in the editing data retaining unit 115 under management by the editing data managing unit 114. The original image data is retained in the image data retaining unit 118 under management by the cache managing unit 117. In addition, on the basis of the editing data retained in the editing data retaining unit 115 and the image data retained in the image data retaining unit 118, the image processing/editing unit 113 processes/edits the data into a desired image, and its results are retained in the edited image retaining unit 116.

Figure 12:
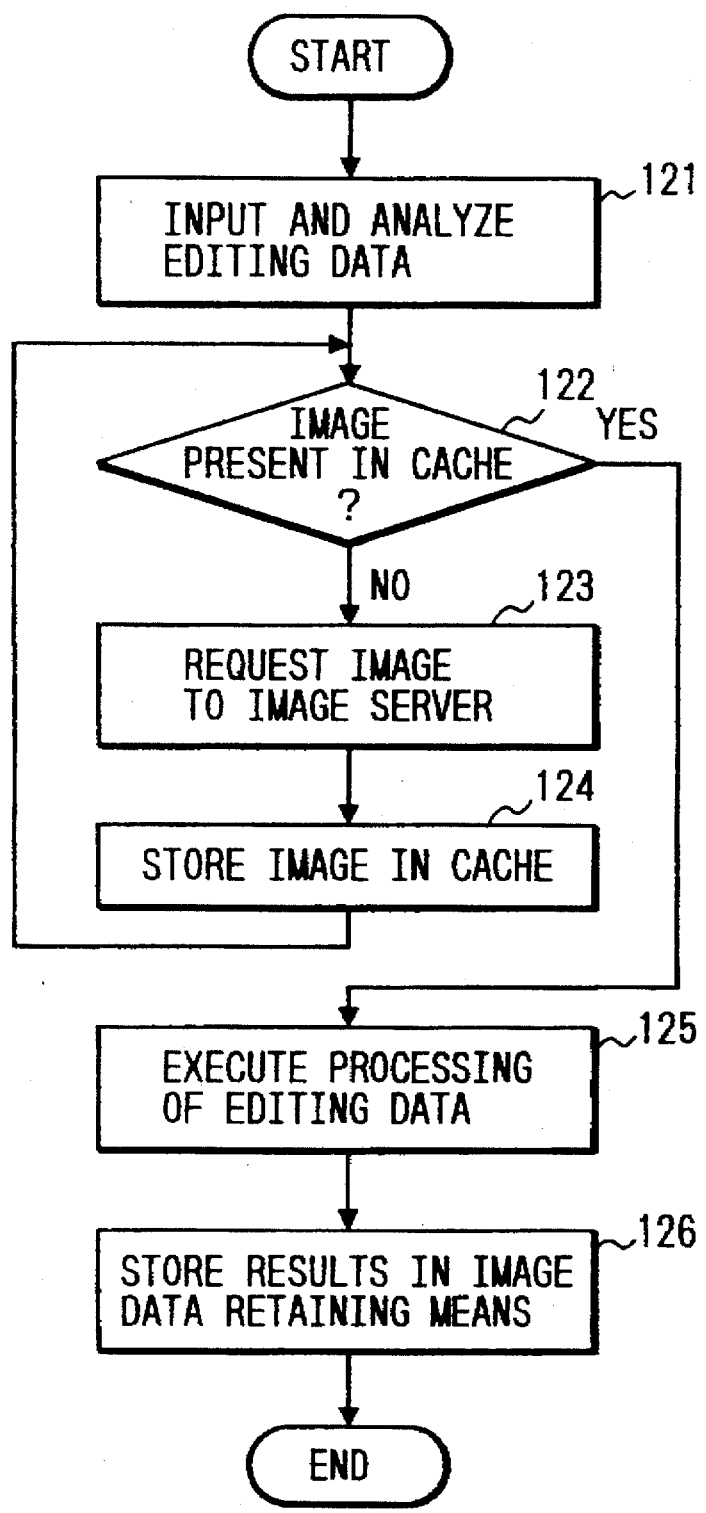
FIG. 12 if a flowchart at a time when the image is edited and processed by another image editing/processing apparatus according to the present invention.

FIG. 12 is a flowchart representing editing and processing by the image by another image editing/processing apparatus in accordance with another embodiment of the present invention.

In FIG. 12, the editing data obtained through the network connection processing unit 111 is applied to the client processing unit 112, and its contents are analyzed (Step 121).

Then, the client processing unit 112 examines on the basis of the analysis of the editing data whether the original image data necessary for editing is being stored in the image data retaining unit 118 (Step 122). This can be ascertained by checking the cache managing unit 117. If desired image data is not present, the client processing unit 112 requests transmission of original image data to the image server 23 through the network connection processing unit 111 (Step 123).

The client processing unit 112 requests transmission of all of the necessary original data to the image server 23, and stores the original image data sent thereto through the network 21 in the image data retaining unit 118 (Step 124).

If it is determined in Step 122 that the desired original image data is present in the image data retaining unit 118 on the side of the client 22, the operation proceeds to Step 125.

Using the original image data, the image processing/editing unit 113 generates an edited image in accordance with the editing data (Step 125).

The edited image generated by the image processing/editing unit 113 is stored in the image data retaining unit 118 (Step 126).

It should be noted that, in this embodiment, the data management by the cache managing unit 117 for managing the image data retaining unit 118 can be performed by a conventionally known technique.

A workstation or a print server, for instance, is known as image editing/processing apparatus having an image data retaining unit capable of retaining the image data for a fixed period of time as described above.

Figure 13:
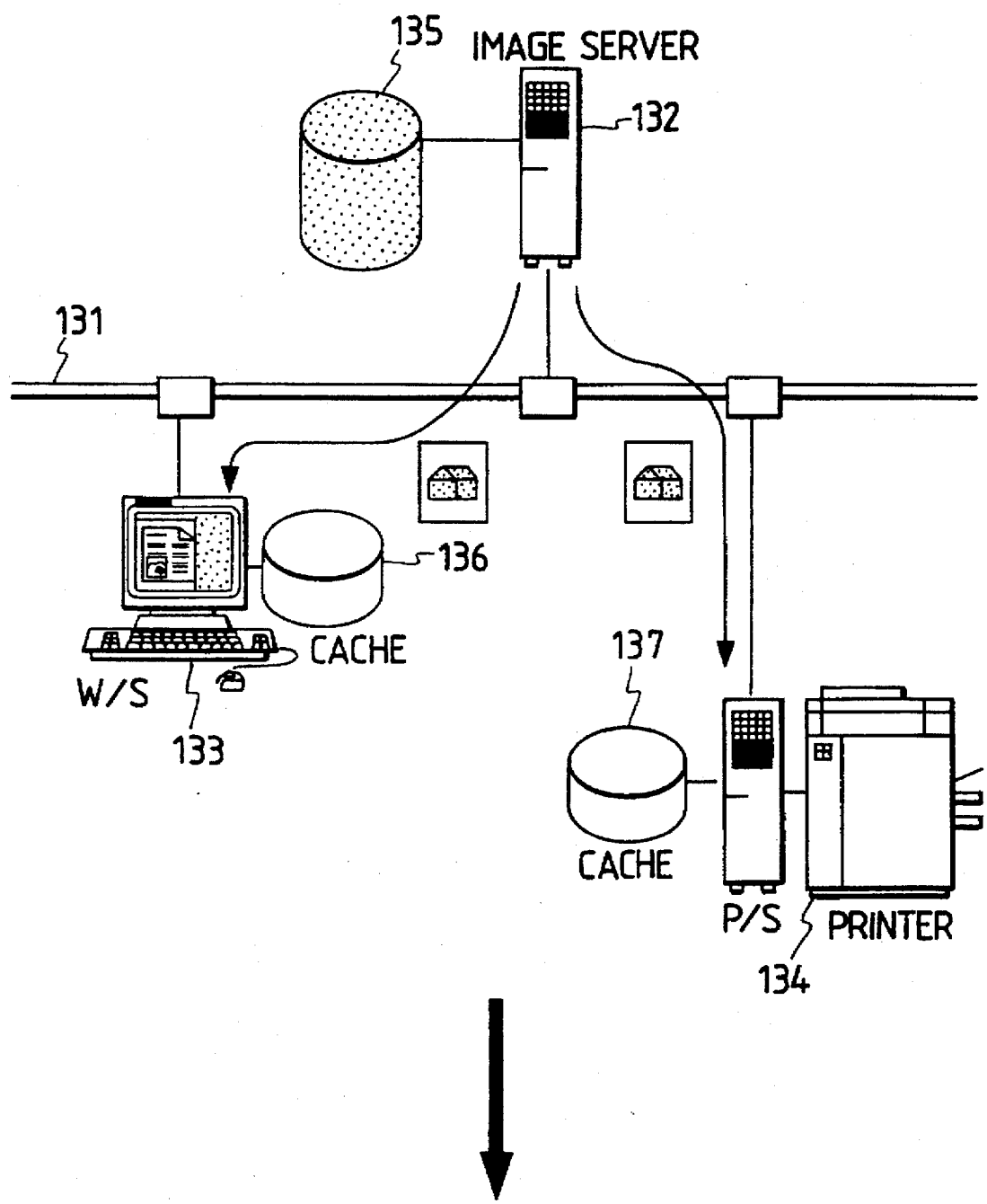
FIG. 13 is a diagram illustrating an image edit processing system in which the image data retaining unit is provided in a workstation or a print server according to the present invention.

FIG. 13 is a diagram illustrating an image edit processing system in which the image data retaining unit is provided in the workstation or the print server in accordance with still another embodiment of the present invention.

Figure 14:
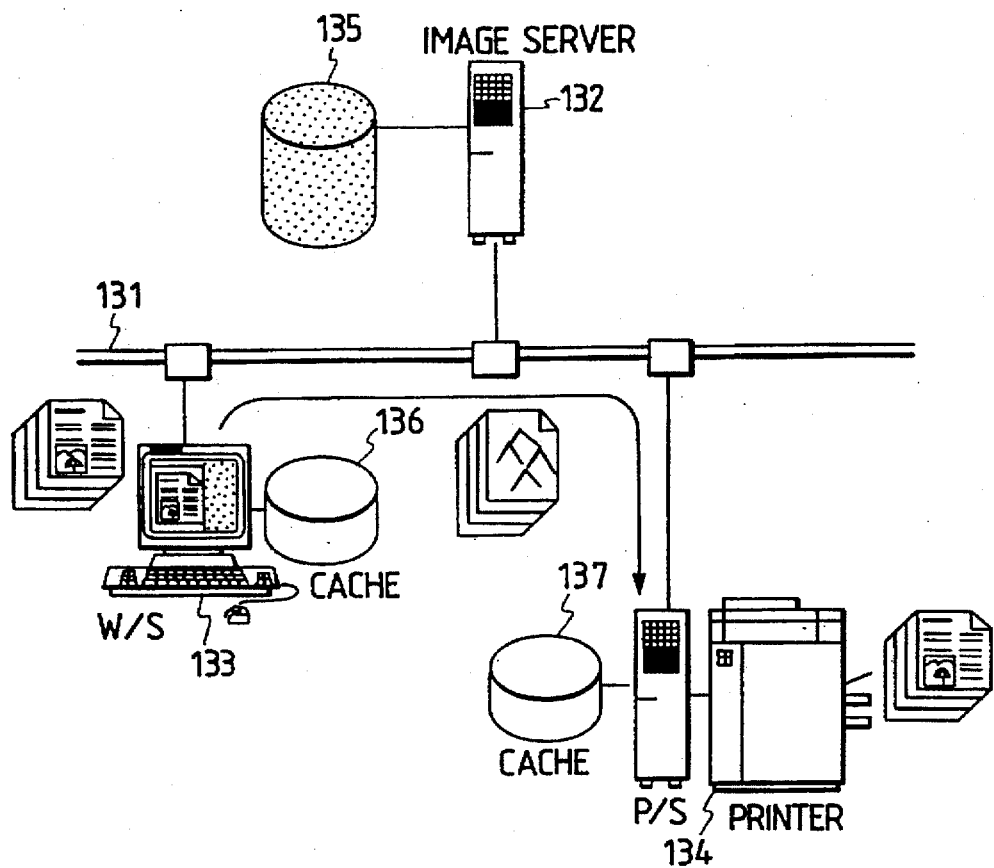
FIG. 14 is a diagram explaining an example for performing edit processing of an image only by the workstation and the print server according to the present invention.
Figure 15:
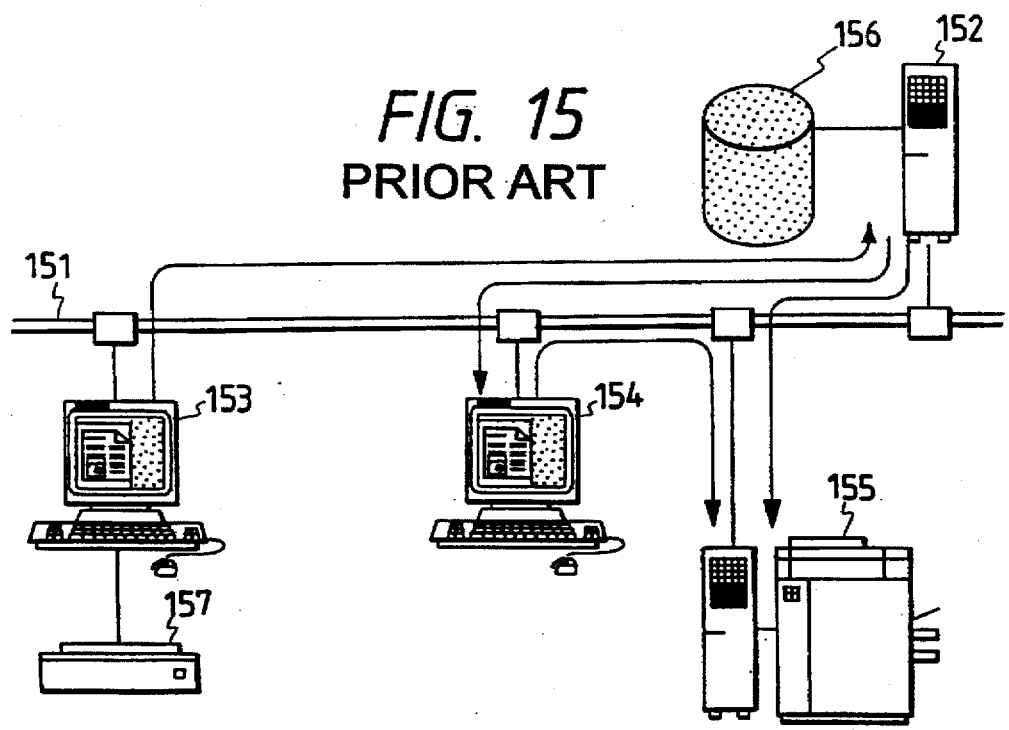
FIG. 15 is a diagram for explaining an outline at a time when an image edit processing apparatus in a conventional example processes and/or edits an image.

FIG. 14 is a diagram showing an exemplary system for performing edit processing of an image only by the workstation and the print server in accordance with a further embodiment of the present invention.

In FIG. 13, an image server 132, a workstation 133, and a print server 134 are connected to a network 131. The image server 132 is provided with an external storage device 135 for storing images. The workstation 133 and the print server 134 are respectively provided with image data retaining units 136 and 137 (cache) capable of retaining image data for a fixed period of time.

As shown in FIG. 13, frequently used original image data transmitted from the image server 132 through the network 131 is retained in the image data retaining units 136 and 137.

If the original image data is being retained in the image data retaining units 136 of the workstation 133 and the print server 134, as shown in FIG. 14, the user does not transfer the original image data from the image server 132 but performs edit processing with respect to the original image data being retained in the image data retaining unit 136 on the basis of the editing data, and then transfers only the editing data to the print server 134 via the network 131.

On the basis of the editing data transferred from the workstation 133, the print server 134 effects edit processing by combining the original image data retained in the image data retaining unit 137, and prints out the same.

Accordingly, since the editing data is allowed to flow through the network 131 and the amount of the image data flowing can be reduced, the load imposed on the network 131 can be reduced.

In addition, by examining the state of the load on the image server 132 and on the workstation 133, the image edit processing system in this embodiment is capable of allowing equipment with the lighter load to perform the edit processing of the image. As described above, the image server 132, the workstation 133, and the print server 134 are capable of sharing the operation depending on the state of their loads.

As described above, in accordance with the present invention, since both the image server and the client are capable of editing and processing images, it is possible to transfer the editing data to the equipment with a lighter load and to allow that equipment to perform the edit processing of images.

In addition, in the image server and the client, since the editing data can be analyzed, the image server is capable of generating and providing image data suitable for edit processing by the client. Accordingly, unnecessary image data is not transferred, thereby reducing the load imposed on the client or the network.

In accordance with the present invention, since the client or the print server side is provided with the image data retaining means for retaining image data for a fixed period of time, the edit processing of the image can be performed by transferring only the editing data. Hence, the load imposed on the network is reduced substantially. In addition, even in a case where the original image is not present in the image data retaining means, if the image data is transferred once thereto from the image server, it is unnecessary to transfer the same via the network each time the image data is to be used.

What is claimed is:

1. An image edit processing system comprising:

an information transmitting path;

a first image edit processing apparatus housed in a first computer, which includes: first information-transmitting-path connecting means for allowing information for editing an image to flow through said information transmitting path or for acquiring information from said information transmitting path; first information analyzing means for analyzing information for editing the image obtained from said information transmitting path; and image-editing-information generating means for editing the image according to an instruction from said first information analyzing means and for generating information for editing the image; and an image storing and editing apparatus housed in a second computer, which includes: image storing means for storing the image; second information analyzing means for analyzing information for editing the image, second image-editing-information generating means for editing the image according to an instruction from said second information analyzing means, and second information-transmitting-path connecting means for allowing the image edited by said first image edit processing apparatus to flow through the information transmitting path and for acquiring information from said information transmitting path, wherein said information transmitting path is disposed externally of both said first computer and said second computer, said first computer and said second computer being connected together through the information transmitting path.

2. An image edit processing system comprising:

an information transmitting path;

a first image edit processing apparatus, which includes:
first information transmitting path connecting means for allowing information for editing an image to flow through said information transmitting path or for acquiring information from said information transmitting path;
first information analyzing means for analyzing information for editing the image obtained from said information transmitting path;
image-editing-information generating means for editing the image according to an instruction from said first information analyzing means and for generating information for editing the image;
first image storing means for storing for a fixed period of time the image edited by said image editing apparatus; and
first image-diverting means for using the image stored in said first image storing means and the image generated by the information for editing the image generated by said first image-editing-information generating means are identical, and an image storing and editing apparatus, which includes:
image storing means for storing the image;
second information analyzing means for analyzing information for editing the image, second image-editing-information generating means for editing the image according to an instruction from said second information analyzing means; and
second information-transmitting-path connecting means for allowing the image edited by said first image edit processing apparatus to flow through the information transmitting path and for acquiring information from said information transmitting path,
wherein said information transmitting path is disposed externally of said first image edit processing apparatus and said image storing and editing apparatus, said image apparatuses being connected together via the information transmitting path.

3. The image edit processing system of claim 2, further comprising a second image edit processing apparatus including:

second image storing means for storing for a fixed period of time the image edited by said image storing and editing apparatus;
third information analyzing means for analyzing information for editing the image;
third information-transmitting-path connecting means for acquiring from the information transmitting path the image edited by said first image edit and processing apparatus and said image storing and editing apparatus;
second image-diverting means for using the image stored in said second image storing means as an edited image if the image stored in said second image storing means and the image generated by the information for editing the image generated by said image-editing-information generating means are identical; and
image outputting means for outputting the image generated by said second image-diverting means.

4. An image edit processing system, comprising:

an information transmitting path;

a first image edit processing apparatus, which includes:
first information-transmitting-path connecting means for allowing information for editing an image to flow through said information transmitting path or for acquiring information from said information transmitting path; first information analyzing means for analyzing information for editing the image obtained from said information transmitting path; and image-editing-information generating means for editing the image according to an instruction from said first information analyzing means and for generating information for editing the image;

an image storing and editing apparatus, which includes: a first image storing means for storing the image; second information analyzing means for analyzing information for editing the image, second image-editing-information generating means for editing the image according to an instruction from said second information analyzing means, and second information-transmitting-path connecting means for allowing the image edited by said first image edit processing apparatus to flow through the information transmitting path and for acquiring information from said information transmitting path; and a second image edit processing apparatus which includes second image storing means for storing for a fixed period of time the image edited by said image storing and editing apparatus; third information analyzing means for analyzing information for editing the image; third information-transmitting-path connecting means for acquiring from the information transmitting path the image edited by said first image editing and processing apparatus and said image storing and editing apparatus; image-diverting means for using the image stored in said second image storing means as an edited image if the image stored in said second image storing means and the image generated by the information for editing the image generated by said image-editing-information generating means are identical; and image outputting means for outputting the image generated by said second image-diverting means;

wherein said information transmitting path is disposed externally of said first image edit processing apparatus, said image storing and editing apparatus, and said second image edit processing apparatus said image apparatuses being connected together through said information transmitting path.

5. An image edit processing system according to claim 4, further comprising: first image storing means for storing for a fixed period of time the image edited by said image storing/editing apparatus, and first image-diverting means for using the image stored in said first image storing means as an edited image if the image stored in said first image storing means and the image generated by the information for editing the image generated by said first image-editing-information generating means are identical.

6. An image edit processing system according to claim 1, 2 or 3, wherein the information for editing the image is formed in a tree structure.

7. An image edit processing system according to claim 6, wherein the image structured at each stage of the tree is stored in said first and second image storing means for storing the image for the fixed period of time and the image storing means.

* * * * *